`(12)` United States Patent
Bierhals

(10) Patent No.: US 12,030,095 B2
(45) Date of Patent: *Jul. 9, 2024

(54) METHOD FOR PROTECTING AN OPTICAL SENSOR OF A VEHICLE FROM ENVIRONMENTAL POLLUTANTS

(71) Applicant: FORD GLOBAL TECHNOLOGIES, LLC, Dearborn, MI (US)

(72) Inventor: Norbert Bierhals, Freising (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,191

(22) Filed: Jan. 31, 2023

(65) Prior Publication Data

US 2023/0173559 A1  Jun. 8, 2023

Related U.S. Application Data

(63) Continuation of application No. 17/319,676, filed on May 13, 2021, now Pat. No. 11,596,986.

(30) Foreign Application Priority Data

May 15, 2020 (EP) ..................... 20175098

(51) Int. Cl.
*B08B 7/02* (2006.01)
*B08B 5/00* (2006.01)
*B60S 1/56* (2006.01)

(52) U.S. Cl.
CPC ............. *B08B 7/028* (2013.01); *B08B 5/00* (2013.01); *B60S 1/56* (2013.01)

(58) Field of Classification Search
None
See application file for complete search history.

(56) References Cited

U.S. PATENT DOCUMENTS 6,452,672 B1 9/2002 Trainoff
7,684,938 B1 3/2010 Feller
(Continued)

FOREIGN PATENT DOCUMENTS

DE 10005341 A1 8/2001
JP S62165127 A 7/1987

OTHER PUBLICATIONS

European Search Report of European Patent Application No. 20175098.1 dated Dec. 4, 2020, 12 pages.

*Primary Examiner* — Eric W Golightly
(74) *Attorney, Agent, or Firm* — Frank A. MacKenzie; Brooks Kushman P.C.

(57) ABSTRACT

A device and method for protecting an optical sensor of a vehicle are disclosed, wherein the sensor is protected from environmental pollutants which may adhere to an optical surface of the sensor if the sensor is exposed to them, and wherein the environmental pollutants are kept away from the sensor by an ultrasonic cleaning of the sensor surface using an ultrasonic field. The ultrasonic field of the ultrasonic cleaning is emitted by a protection device into the air to provide a protection zone around the optical surface of the sensor such that a contact of the optical surface with the environmental pollutants is avoided, wherein the environmental pollutants are moved and/or destroyed in the air away from the sensor if they enter the protection zone), and wherein the protection zone provides a contactless cleaning of the sensor.

17 Claims, 3 Drawing Sheets

(56) References Cited

U.S. PATENT DOCUMENTS

| | | |
|---|---|---|
| 9,880,091 B2 | 1/2018 | Henriksen |
| 11,596,986 B2 * | 3/2023 | Bierhals .................... B08B 5/00 |
| 2018/0009418 A1 | 1/2018 | Newman |

* cited by examiner

METHOD FOR PROTECTING AN OPTICAL SENSOR OF A VEHICLE FROM ENVIRONMENTAL POLLUTANTS

RELATED APPLICATIONS AND CLAIM OF PRIORITY

This patent document claims priority to, and is a continuation of, U.S. patent application Ser. No. 17/319,676, filed May 13, 2021, and issued as U.S. Pat. No. 11,596,986 on Mar. 7, 2023 which claims priority under 35 U.S.C. 119(e) to European Patent Application No. EP20175098.1, filed May 15, 2020. The disclosure of each priority document is fully incorporated into this document by reference.

TECHNICAL FIELD

This patent document concerns a method for protecting an optical sensor of a vehicle from environmental pollutants. The optical sensor comprises a protection device, which is designed to emit an ultrasonic field to generate a protection zone in front of the sensor. Furthermore, this patent document also concerns a vehicle comprising the optical sensor.

BACKGROUND

An optical sensor of a camera requires a clear field of view for rendering a data acquisition of clear images. One aspect is to provide a clean surface at the optic or windshield of the sensor. The optical sensor can be contaminated by accumulating dust, stains or some other environmental contaminants at the optic of the optical sensor. The environmental contaminants may affect image clarity of the camera. The contamination on the sensor can be kept to a minimum by covering the optics after use for protection from the outside environment. However, the optics may be contaminated while the optics of the sensor are being used to render images. The operation of the sensor may have to be interrupted due to maintenance or cleaning of the sensor.

U.S. Pat. No. 9,880,091 describes an automated ultrasonic cavitation cleaning in a liquid analysis system and measurement of a process liquid contained inside a container or flowing in a process line by means of an inline or sidestream optical system. A window is cleaned in a water tank by generating gas bubbles in the water that is contained in the tank. The gas bubbles are generated by generating ultrasonic sound waves that cause parts of the water to evaporate.

U.S. Pat. No. 7,684,938 describes cleaning of contaminated acoustic windows or transducers of an ultrasonic sensor by applying an acoustic cleaning signal to the acoustic ultrasonic windows which are used in the flow measurement of a fluid. The transducers of the ultrasonic sensor are cleaned by applying a low frequency vibration.

U.S. Pat. No. 6,452,672 describes removing particulate materials that adhere to internal optical surfaces of optical flow cells that are used for making scattered light measurements on liquid borne samples. The particulate materials can cause distortions of the scattered light signals to be measured from the illuminated samples within the flow cell. The particulate materials are removed or cleaned by applying an ultrasonic vibration.

SUMMARY

In some embodiments, a method for protecting an optical sensor of a vehicle from environmental pollutants which may adhere to an optical surface of the sensor. The method includes, by a protection device, emitting an ultrasonic field into air to provide a protection zone in front of an optical surface of a sensor such that: (a) a contact of the optical surface with the environmental pollutants is avoided; and (b) the environmental pollutants are destroyed in the air and/or moved away from the sensor by the ultrasonic field when they enter the protection zone. The protection zone therefore provides a contactless cleaning of the sensor. For example, when emitting the ultrasonic field the protection device may emit an ultrasonic wave into an air volume in front of the optical surface of the sensor, which causes cavitation in the air, the environmental pollutants, or both, in which case the protection zone will include a spatial volume in the air in front of the optical surface of the sensor.

The environmental pollutants may comprise, for example, water droplets and/or dirt particles.

In some embodiments, the optical surface comprises a transparent windshield that either: (a) is mounted around or in front of a lens of the optical sensor, or (b) is the lens of the optical sensor.

In some embodiments, the environmental pollutants comprise water droplets, dirt particles, or both. The water droplets may be evaporated and/or the dirt particles may be pulverized due to cavitation caused by the ultrasonic field. A sound pressure level of the ultrasonic field may set to such a value that the cavitation is caused if the water droplets, the dirt particles, or both enter the protection zone. In addition, a shape, size or both of the protection zone may be such that the protection zone reaches out into a stream of air.

The evaporated water, the pulverized dirt or both may be transported away from the sensor over an air stream by wind. The air stream may be generated by a driving movement of the vehicle, by an air blower of the protection device, or both.

In some embodiments, the optical surface may be provided in a tilted position with regard to a predefined forward driving position of the vehicle, with regard to an optical axis of the sensor, or both.

In some embodiments, the optical surface may be part of an ultrasonic transducer of the protection device, or the optical surface is mechanically coupled to the transducer of the protection device, in each case such that at least a part of the ultrasonic field is emitted by the optical surface itself.

In some embodiments, the environmental pollutants may be destroyed by the ultrasonic field that is generated such that the environmental pollutants are pushed in the air away from the optical surface.

In some embodiments, the method also includes the sensor continuously for generating image data while the optical surface is moved through an air volume that comprises the environmental pollutants.

Various combinations of the features of the different embodiments are also intended to be covered by this disclosure.

BRIEF DESCRIPTION OF THE DRAWINGS

In the following an example implementation of the invention is described. The figures show.

DETAILED DESCRIPTION

Figure 1:
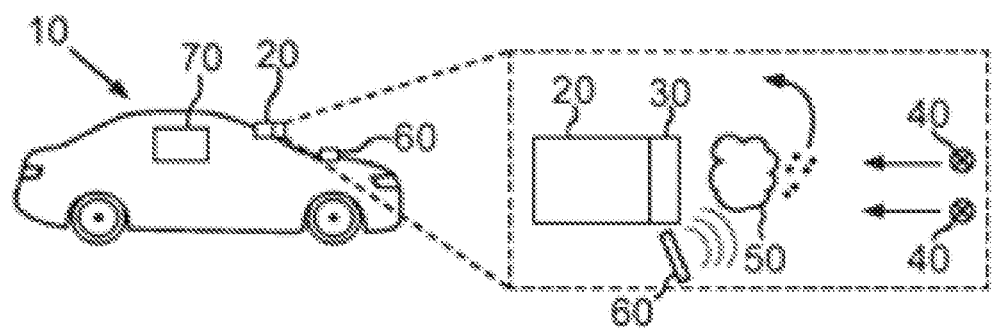
FIG. 1 a schematic illustration of an embodiment of the inventive vehicle.

In some aspects, this document describes a method and system for contactless cleaning of an optical sensor without interrupting the operation of the optical sensor for a data acquisition.

The method and system are accomplished by the subject matter of the independent claims. Advantageous further embodiments specified in the following description, the dependent claims and the figures.

This document also describes a method for protecting an optical sensor of a vehicle. The optical sensor is protected from environmental pollutants which otherwise might adhere to an optical surface of the sensor if the sensor is exposed to them or if they reach an optical surface of the sensor. In other words, the environmental pollutants from outside environment can be removed while the sensor is being used for data acquisition and/or before a contamination from the environment is collected at the optical surface of the sensor when the optical surface may be exposed to the outside environment and/or when a shutter of the optical surface is open. The optical surface may be a lens and/or a transparent windshield for such a lens and/or a transparent component made of glass or plastics. The environmental pollutants may be water from rain and/or dust from the environment and/or some other contamination or granular particles from the environment that may settle down on the optical surface and affect the quality of sensor data or clarity of the sensor images. The environmental pollutants may be kept away from the sensor by an ultrasonic sound wave field generated in front of the optical surface of the sensor and/or a pollutant already adhering to the surface may be removed using the ultrasonic field. In other words, a strong sound wave, preferably stronger than 100 dB or stronger than 130 dB, may be provided to the air volume in front of the optical surface and/or it may be exposed to the optical surface of the sensor such that the air and/or the optical surface of the sensor may be shaken by vibrations of the applied ultrasonic frequency and/or the pollutants may be caused to drift away from the optical surface of the sensor by a pressure of the applied ultrasonic frequency or the field.

The optical sensor may be a camera and/or a LIDAR sensor and/or radar sensor and/or an infrared sensor. The optical sensor may be mounted on a vehicle for acquiring sensor data from the environment of the vehicle.

To protect the optical sensor from the environmental pollutants, the ultrasonic field of the ultrasonic cleaning is emitted by a protection device to provide a protection zone around the optical surface of the sensor, the protection zone is the zone where the ultrasonic field is effective. As a result, a contact of the sensor with the environmental pollutants is avoided as the ultrasonic field acts on the pollutants before they can reach the optical surface of the sensor. In other words, an ultrasonic wave of a predefined and/or configurable frequency and/or sound pressure level may be generated into the air volume in front of the optical surface of the sensor such that a cavitation can be caused in the environmental pollutants in the air and/or the pollutants from outside environment may be prevented from reaching the optical surface of the sensor. The protection zone may be a spatial volume in the air in front of the optical surface which consists of the ultrasonic field emitted from the protection device and/or which provides a mask to the optical surface against the pollutants. The predefined frequency of the wave may be a frequency at which the environmental pollutants may be resonated to cause the cavitation. Possible values of the frequency may be in the range from 20 kHz to 200 kHz. The environmental pollutants are moved and/or destroyed in the air away from the sensor if they enter the protection zone. In other words, the environmental pollutants may be pushed in the air away from the optical surface by a pressure of air stream around a moving vehicle. Alternatively or additionally, the cavitated pollutants may be blown away by a pressure of the ultrasonic waves and/or an air blower. Furthermore, the invention describes that the protection zone provides a contactless cleaning of the sensor. In other words, the optical surface of the surface can be cleaned without using a cleaning liquid and/or a mechanical part on the surface of the sensor and/or an optical component of the sensor.

The protection device may for example be an ultrasonic transducer and/or a sound wave generator.

The methods and systems described in this document may provide contactless cleaning of an optical surface of a vehicle sensor based on a protection mechanism that ensures an availability of the vehicle sensor for an uninterrupted operation during the cleaning of the optical surface.

Additional technical advantages are described below.

In some embodiments, the environmental pollutants describe water droplets and/or dirt particles. In other words, raindrops and/or sand grains can be kept away for the optical surface. This may provide an advantage that actual quality of an optical component and/or lens and/or sensor data can be maintained by keeping the optical surface of the sensor from a contamination.

In some embodiments, the optical surface describes a transparent windshield that is mounted around and/or in front of a lens of the sensor and/or is the lens itself. In other words, a transparent cover can be used. This may provide an advantage that the optics of the sensor can be concealed from direct contact with the environmental contamination. The windshield can be a plate made of glass or plastics. It can be used to prevent scratches.

In some embodiments, water droplets comprised in the pollutants are evaporated and/or dirt particles comprised in the pollutants are pulverized due to a cavitation in the environmental pollutants caused by the ultrasonic field. In other words, the pollutants can be reduced in size and/or converted into fragments by applying an ultrasonic frequency on the pollutants if the applied frequency is above a threshold frequency. The threshold frequency can be a range of ultrasonic frequencies, which can be selected to cause a growth of gaseous bubbles in the pollutants to a maximum and/or to an unstable extent. Experiments with example pollutants (water drops and/or sand grains can be performed in order to find suitable values for the frequency and/or sound pressure level for a given setup). The unstable bubbles may be collapsed into fragments of the pollutants if the applied frequency is increased beyond the threshold frequency. Cavitation is a standard process that defines a formation of gas bubble in liquids or solids when they are subjected to a drop or fluctuation in their local pressure, which is caused by pushing the liquids, or the solids quicker than they can react. This provides an advantage that the pollutants can be reduced in size and/or weight by passing a strong ultrasonic field through them so that the lighter and smaller pollutants can be easily pushed away from the optical surface of the sensor by the air stream.

In some embodiments, a sound pressure level of the ultrasonic field is set to such a value that the cavitation is caused if the water droplets and/or the dirt particles enter the protection zone and a shape and/or size of the protection zone is such that it reaches out into a given stream of air. In other words, the pressure of the ultrasonic field may be increased such that vacuum bubbles or voids in the pollutants may be caused. Intensity of the ultrasonic field may be adapted such that the protection zone can be stretched into air or formed over a large area in front of the optical surface so that the pollutants may be cleaned and/or removed into the air volume, which may be spatially located away from the optical surface. The ultrasonic field may be configured or manipulated to provide a shape of the protection zone for generating an optimized cavitation in all directions of the optical surface. The shape of the ultrasonic field may for example be manipulated by introducing multiple transducers in the protection device. This may provide an advantage in that the evaporation of water droplets and/or the pulverization of the dirt particles can be performed at a distance from the optical surface of the sensor so that an intrusion of the pollutants into the optical surface from all directions can be avoided.

In some embodiments, the evaporated water and/or the pulverized dirt are transported away from the sensor over an air stream by wind. In other words, fragments of the pollutants resulting from the cavitation may be blown away by wind pressure around the optical surface of the sensor. This may provide an advantage that the fragments of water and the dirt, which are reduced in size and weight due to cavitation, can be kept from the optical surface by a pressure of wind. The pressure of the wind may be generated by airflow in the surroundings. The air pressure may be a standard atmospheric pressure and/or an increased wind pressure caused due to a weather condition.

In some embodiments, the air stream is generated by a movement of the vehicle and/or by an air blower of the protection device. In other words, the wind pressure required to transport the cavitated pollutants into the air steam away from the optical surface may be caused by speed of a moving vehicle and/or by an external source mounted on the vehicle. The external source of the wind pressure may be a fan and/or an air blower. The external source may be mounted on the vehicle in the close proximity of the optical surface of the sensor and/or it may be coupled with the optical surface. This may provide an advantage that the environmental pollutants and/or a contamination of different types and/or sizes from the outside environment can be kept from the optical surface by adjusting speed of the vehicle and/or speed or pressure of the fan and/or the air blower.

In some embodiments, the optical surface is provided in a tilted position with regard to a predefined forward driving position of the vehicle and/or with regard to an optical axis of the sensor. In other words, the optical surface may be positioned at a predefined angle with respect to a reference axis. The reference axis may be an axis of the sensor and/or a direction of the vehicle movement and the angle of the optical surface may be a predefined angle and/or an adjustable angle according to the direction of the wind and/or vehicle movement. The angular positioning of the optical surface provides a directional flexibility in preventing the environmental pollutants from the optical surface of the sensor.

In some embodiments, the optical surface is part of an ultrasonic transducer of the protection device or is mechanically coupled to the transducer of the protection device such that at least a part of the ultrasonic field is emitted by the optical surface itself. In other words, the ultrasonic field may be generated directly from the optical surface and/or in front of the optical surface of the sensor. This provides an advantage that the air volume directly in front of and/or around the optical surface may be covered by the protection zone so that the pollutants travelling towards the optical surface may be prevented.

In some embodiments, the environmental pollutants are destroyed by the ultrasonic field that is generated such that they are pushed in the air away from the optical surface. In other words, the frequency of the ultrasonic waves is set at a value that may lead to a cavitation and/or collapse of the pollutants into a size that can be dragged away from the protection zone due to the pressure of the ultrasonic field and/or the air pressure in the surrounding of the optical surface. The size of the collapsed particles may be controlled by an applied frequency and/or a range of frequencies of the ultrasonic waves. This provides an advantage that the ultrasonic waves can perform a dual operation of reducing the size of the environmental pollutants and forcing them with a pressure into the air stream away from the protection zone.

In some embodiments, the sensor is used continuously for acquiring data while the optical surface is moved through an air volume that comprises the pollutants. In other words, the sensor can perform an uninterrupted operation of data acquisition if the optical surface is being cleaned and/or if the cavitation in the pollutants is being performed. The data acquisition here may for example be images of a camera. This provides an advantage that the images, which are rendered by the camera, are not blurred since the ultrasonic field is invisible.

Some embodiments include an optical sensor for a vehicle that may be operated. The optical sensor may comprise a protection device that is designed to provide a protection and/or cleaning for an optical surface of the optical sensor. The protection device may comprise at least an ultrasonic transducer for generating an ultrasonic field. The protection device is adapted to perform a method according to any of the embodiments of the invention.

The invention provides the optical sensor, which may be a camera or a LIDAR senor, or an infrared sensor.

The invention is also concerned with a vehicle comprising an embodiment of the inventive optical sensor. In particular, the vehicle is a motor vehicle. The vehicle may be an autonomously driving vehicle. The vehicle may be designed for example as a passenger vehicle or a truck or a bus.

The vehicle comprises an electronic control unit with an autonomous driving function. The electronic control unit may be a microprocessor or a microcontroller or an embedded system. The electronic control unit may be designed to provide an autonomous driving function for assisting the vehicle to drive the vehicle autonomously. The autonomous driving function may be designed to assist the vehicle while the optical sensor is surveilling the surroundings. The autonomous driving function may assist the vehicle for driving autonomously based on sensor data from the optical sensor.

In the embodiments described in this document, the described components each represent individual features which are to be considered independently of each other and which each develop the embodiments also independently of each other and thereby are to be regarded as a component of the embodiments in individual manner or in another than the shown combination. Furthermore, the described embodiments can also be supplemented by further features already described.

In the figures, identical reference signs indicate elements that provide the same function.

FIG. 1 shows a top view of vehicle 10. The vehicle 10 can, for example, be a passenger vehicle or a bus or a truck. The vehicle 10 may be an autonomously driving vehicle comprising an autonomous driving function provided by an electronic control unit 70. The vehicle 10 may comprise an optical sensor 20 for surveilling or observing the surroundings of the vehicle 10. The optical sensor 20 may be a LIDAR sensor or a camera or a radar sensor. In this example, the optical sensor 20 is designed as a camera. The optical sensor 20 may be mounted on the vehicle 10. The optical sensor 20 may be interfaced with an optical surface 30 and/or the optical surface 30 may be mounted in front of the optical sensor 20. The optical surface 30 may be a lens or a transparent windshield or a transparent cover made of glass or plastics. The optical surface 30 may be designed to focus light. Alternatively or additionally, the optical surface 30 may be designed such that the optical sensor 20 may be protected from a contact with a contamination or environmental pollutants 40. The environmental pollutants 40 may be water droplets from rain and/or dirt particles from environment. The water particles and/or the dirt particles may collect at the optical surface 30 and thereby degrade the performance and/or clarity of the optical surface 30. For example, the water droplets and/or the dirt particles may blur images from the camera.

The optical surface 30 may be cleaned or prevented from the environmental pollutants 40 so that clear images may be acquired from the camera. The electronic control unit 70 of the vehicle 10 may detect the surroundings by means of sensor data from the optical sensor 20. For a clarity of the sensor data of the optical sensor 20, the optical surface 30 may be cleaned or protected from a contamination, which may be caused by an adherence of the environmental pollutants 40 to the optical surface 30. The optical sensor 20 may comprise at least one protection device 60. The protection device 60 may provide a cleaning or a protection mechanism to keep the optical surface 30 from the environmental pollutants 40. The protection device 60 may be mounted on the vehicle 10 and/or in the close proximity of the optical sensor 20. Alternatively or additionally, the protection device 60 may be coupled with the optical surface 30.

The protection device 60 may comprise at least an ultrasonic transducer for generating ultrasonic waves or ultrasonic field. The ultrasonic field may be generated to create a protection zone 50 in front of the optical surface 30. The protection zone 50 may be formed into the air surrounding the optical surface to block the environmental pollutants 40 from reaching the optical surface 30. The distance of the protection zone 50 from the optical surface 30 may be set by adjusting the intensity and/or shape of the ultrasonic field and/or by changing at least a parameter of the protection device 60. The parameter of the protection device 60 may be a frequency and/or amplitude of the emitted ultrasonic waves.

The protection zone 50 may keep the optical surface 30 clean by blocking the environmental pollutants 40 in the air at distance from the optical surface 30. The distance may be in the range of 10 to 20 millimeters. The protection zone 50 may block the environmental pollutants 40 coming from all directions with respect to the optical surface 30. The protection zone 50 may cause the environmental pollutants 40 to be destroyed in the air. The environmental pollutants 40 may be destroyed by a cavitation resulting from frequency fluctuations in the environmental pollutants 40 when the environmental pollutants 40 enter into the protection zone 50 and/or when the ultrasonic field is passed through them. Alternatively or additionally, the environmental pollutants 40 may be collapsed into fragments due to their interaction with the protection zone 50. The fragments of the environmental pollutants 40 may be made so small in size and light in weight that they can be pushed away in the air stream outside the protection zone 50 if a high pressure is provided against their travel direction. The high pressure may be a pressure value, which is higher than a threshold pressure. The threshold pressure may be a predefined pressure value amounting to a measure of a pressure by the fragments of a respective pollutant in the environment.

The fragments of the environmental pollutants 40 may be pushed away in the air stream by a pressure of wind. The wind pressure may depend for example on weather conditions or normal wind existing in the surrounding atmosphere. Alternatively or additionally, the fragments of the environmental pollutants 40 may be moved away from the protection zone 50 due to a movement of the vehicle 10. The wind pressure may be significantly increased compared to the normal atmospheric pressure due to the movement of the vehicle 10. The wind pressure may be increased and/or adapted by changing speed of the vehicle 10 such that the fragments of the environmental pollutants 40 resulting from the cavitation may be pushed into the airstream away from the optical surface 30. The protection device 60 provides a contactless cleaning of optical surface 30 of the optical sensor 20. For example, the contactless cleaning can be performed without using mechanical means or parts and/or liquid cleaning agents on the surface of the optical surface 30. The contactless cleaning can be performed without causing scratches on the optical surface 30. The contactless cleaning may be performed without causing an interruption in an operation of the optical sensor 20. The contactless cleaning provided by the invisible protection zone 50 may be performed without sacrificing quality or clarity of the sensor data of the optical sensor 20.

The protection device 60 may be operated when the vehicle 10 is driving and/or when the optical sensor 20 is acquiring sensor data from the surroundings. The protection device 60 may be operated if the optical surface 30 is exposed or uncovered for an operation of the optical sensor 20. The protection device 60 may be controlled by the electronic control unit 70 of the vehicle. The protection device 60 may be signaled by the electronic control unit 70 to perform a cleaning operation if the vehicle 10 is switched on and/or it is raining and/or when dust is flowing in the air due to wind and/or movement of the vehicle 10.

Figure 2:
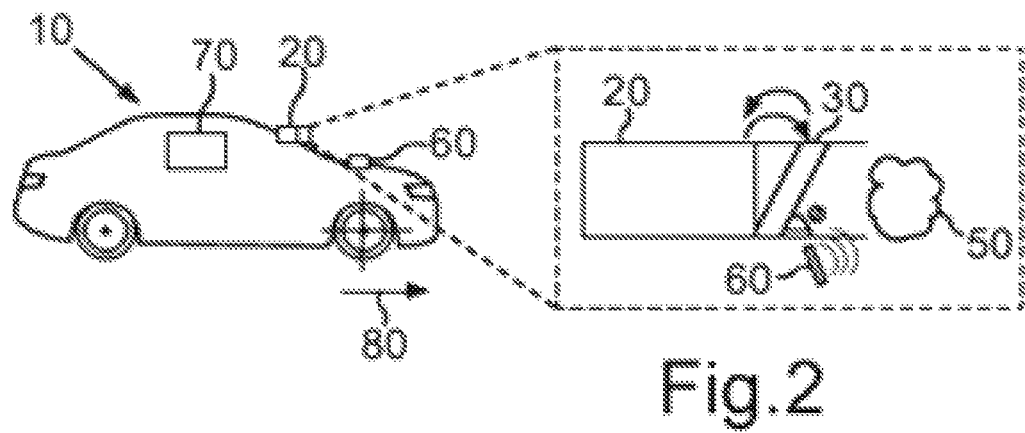
FIG. 2 a schematic illustration of a tiled position of the optical surface.

FIG. 2 shows an illustration of a tilted position of the optical surface 30. The optical surface 30 may be tilted with respect to a forward driving position of the vehicle 10 to prevent the environmental pollutants 40 in a direction in which a probability of the environmental pollutants 40 may be estimated based on the wind direction and/or travel direction 80 of the vehicle 10. The optical surface 30 may be a movable surface that can be rotated at a predefined angle θ along an axis of the vehicle movement or a wheel plane of the vehicle 10. The optical surface may be tilted at an angle along a longitudinal axis of a wheel movement and/or x-axis of the travel direction 80 of the vehicle 10. The optical surface 30 may be tilted by the electronic control unit 70 of the vehicle 10. Alternatively or additionally, the tilt angle may be determined by the electronic control unit 70 of the vehicle 10. The arrangement of the tilted optical surface 30 ensures an air stream along the optical surface 30 whenever the vehicle 10 is moving forward.

The tilt angle and/or the positioning of the optical surface 30 may be determined depending on the driving speed and/or travel direction 80 of the vehicle 10 as shown in FIG. 2 If vehicle is moving straight along the road, the optical surface 30 may be positioned at an angle of 90° with respect to the travel direction 80 of the vehicle 10. If the vehicle 10 changes the travel direction 80 and/or the wheel movement, the optical surface 30 may be rotated in perpendicular to the travel direction 80 of the vehicle 10.

The optical surface 30 may also be tilted at an angle depending on a wind direction, which is blowing relative to the movement of the vehicle 10. The protection device 60 may be configured to provide the protection zone 50 such that the environmental pollutants 40 flowing in the wind direction can be prevented from the optical surface 30. For example, if the wind is blowing from right side relative to the travel direction 80 of the vehicle 10, the optical surface 30 may be tilted at 45° with reference to the travel direction 80. The wind direction may be determined directly by the electronic control unit 70 and/or through a device (not shown here) or a compass that may be mounted on the vehicle 10. The wind direction may be predetermined before the vehicle 10 is driven and/or the optical sensor 20 is operated so that the initial positioning of the optical surface 30 may be determined.

Figure 3:
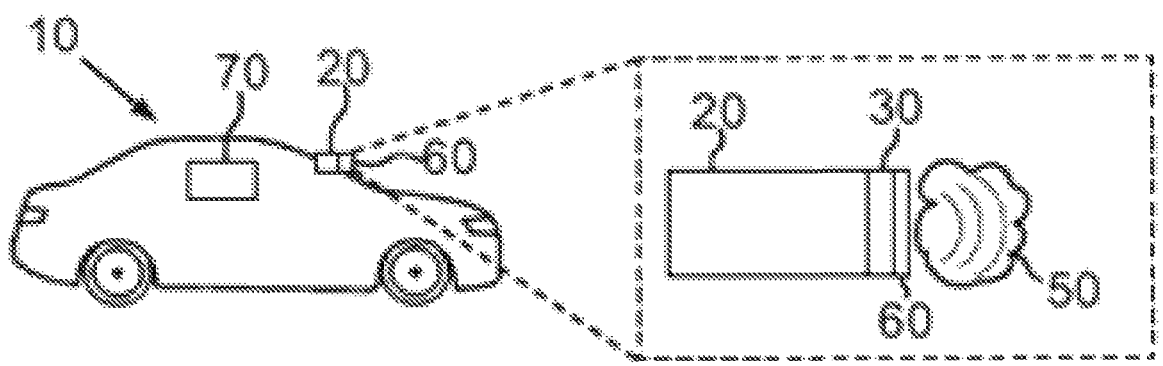
FIG. 3 a schematic illustration of a protection device coupled with the optical surface of the sensor.

FIG. 3 shows an illustration of the optical surface 30 coupled with the ultrasonic transducer of the protection device 60. The ultrasonic transducer and protection device 60 may be a single or the same unit and may be used interchangeably for generating the ultrasonic field. The protection device 60 may be mechanically coupled or interfaced with the optical surface 30. The protection device 60 may be a part of the optical surface 30. The optical surface 30 itself may be a protection device 60. The protection device 60 may be operated or activated if the optical surface 30 is exposed or uncovered and/or if the optical sensor is in an activated position for acquiring sensor data from the surroundings.

The coupled protection device 60 may provide the protection zone 50 directly in front of the optical surface 30. The protection zone 50 by the coupled protection device 60 may be dynamically provided if the optical sensor 20 is activated and/or if the optical surface 30 is exposed for an activation of the optical sensor 20. Alternatively or additionally, the optical surface 30 may start generating the ultrasonic field instantaneously or dynamically to create the protection zone 50 if the optical sensor 20 is activated and/or operated for acquiring sensor data from the surroundings. The coupled protection device 60 may be a movable device, which can be configured to rotate along a reference axis, which may for example be an axis of the travel direction of the vehicle 10. The protection zone 50 may be moved relative to an angular rotation of the optical surface 30 or the coupled protection device 60.

The main idea is to protect the sensor from water or dirt, before it reaches the sensor face. For this, the idea is to use the physical effect of cavitation. For an example, the cavitation created by an ultrasonic field around the sensor. A water drop enters the front of the field, a pressure difference occurs and the drop gets vaporized. The created steam will be transported over an air stream.

Overall, the implementation example shows how a sensor cleaning and protection based on cavitation may be provided.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to".

The invention claimed is:

1. A method for protecting an optical sensor of a vehicle from environmental pollutants which may adhere to an optical surface of the sensor, the method comprising:
    emitting an ultrasonic field into air in front of an optical surface of a sensor to form a protection zone in the air such that:
        the protection zone destroys and/or moves the environmental pollutants in the air and blocks the environmental pollutants reaching the optical surface of the sensor, and
        the protection zone provides a contactless cleaning of the sensor,
    wherein a sound pressure level of the ultrasonic field is set to such a value that cavitation is caused if water droplets, dirt particles, or both enter the protection zone.

2. The method of claim 1, wherein the protection zone extends to a distance from the optical surface, wherein the distance ranges from 10 to 20 millimeters.

3. The method of claim 1, wherein:
    emitting the ultrasonic field comprises emitting an ultrasonic wave into an air volume in front of the optical surface of the sensor, which causes cavitation in the air, the environmental pollutants, or both; and
    the protection zone comprises a spatial volume in the air in front of the optical surface of the sensor.

4. The method of claim 1, wherein the environmental pollutants comprise water droplets and/or dirt particles.

5. The method of claim 1, wherein the optical surface comprises a transparent windshield that either:
    is mounted around or in front of a lens of the optical sensor; or
    is the lens of the optical sensor.

6. The method of claim 1, wherein
    the environmental pollutants comprise water droplets, dirt particles, or both; and
    the water droplets are evaporated and/or the dirt particles are pulverized caused by the ultrasonic field.

7. The method of claim 1, wherein a shape, size or both of the protection zone are such that the protection zone reaches out into a stream of air.

8. The method of claim 1, wherein:
    the environmental pollutants comprise water droplets, dirt particles, or both; and
    the water droplets, the pulverized dirt or both are transported away from the sensor over an air stream by wind.

9. The method of claim 8, wherein the air stream is generated by a driving movement of the vehicle, by an air blower or both.

10. The method of claim 1, wherein the optical surface is provided in a tilted position with regard to a predefined forward driving position of the vehicle, with regard to an optical axis of the sensor, or both.

11. The method of claim 1, wherein the optical surface is part of an ultrasonic transducer or is mechanically coupled to the ultrasonic transducer such that at least a part of the ultrasonic field is emitted by the optical surface itself.

12. The method of claim 1, wherein the environmental pollutants are destroyed by the ultrasonic field that is generated such that the environmental pollutants are pushed in the air away from the optical surface.

13. The method of claim 1, further comprising using the sensor continuously for generating image data while the optical surface is moved through an air volume that comprises the environmental pollutants.

14. The method of claim 1, wherein the optical sensor is a component of the vehicle.

15. The method of claim 1, wherein the method further comprises:
- by the vehicle, executing an autonomous driving function for driving the vehicle autonomously while the optical sensor is surveilling surroundings of the vehicle.

16. The method of claim 1 further comprising, by the optical surface of the sensor, tilting at an angle depending on wind direction which is blowing relative to movement of the vehicle.

17. A method for protecting an optical sensor of a vehicle from environmental pollutants which may adhere to an optical surface of the sensor, the method comprising:
- emitting an ultrasonic field into air in front of an optical surface of a sensor to form a protection zone in the air such that:
- the protection zone destroys and/or moves the environmental pollutants in the air and blocks the environmental pollutants reaching the optical surface of the sensor,
- the protection zone provides a contactless cleaning of the sensor, and
- by the optical surface of the sensor, tilting at an angle depending on wind direction which is blowing relative to movement of the vehicle.

* * * * *